Figure 1:
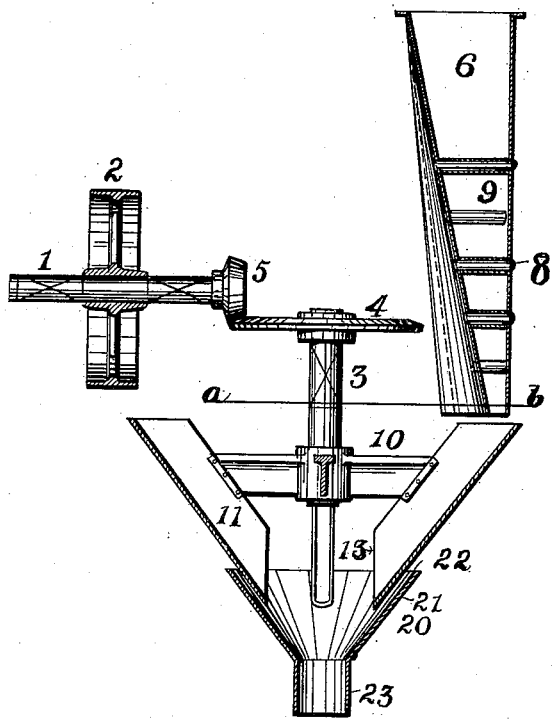

No. 621,771. Patented Mar. 21, 1899.
C. A. SNYDER, D. J. CHEESMAN & J. A. MOORE.
ORE SAMPLER.
(Application filed June 25, 1898.)

(No Model.)

WITNESS:
M. H. Lloyd.
F. R. Byrnes

INVENTORS
Charles A. Snyder,
John A. Moore,
David J. Cheesman,
BY
James A. Kellor
ATTORNEY

UNITED STATES PATENT OFFICE.

CHARLES A. SNYDER, DAVID J. CHEESMAN, AND JOHN A. MOORE, OF BOULDER, COLORADO.

ORE-SAMPLER.

SPECIFICATION forming part of Letters Patent No. 621,771, dated March 21, 1899.

Application filed June 25, 1898. Serial No. 684,512. (No model.)

*To all whom it may concern:*

Be it known that we, CHARLES A. SNYDER, DAVID J. CHEESMAN, and JOHN A. MOORE, citizens of the United States, residing at Boulder, in the county of Boulder and State of Colorado, have invented certain new and useful Improvements in Ore-Samplers, of which the following is a specification, reference being had therein to the accompanying drawings.

This invention relates to measuring instruments, and more especially to that class thereof known as "tollers;" and the object of the same is to produce a sampler for taking from a downwardly-flowing stream of ore, grain, or the like, or from liquids or other substances, certain proportions or samples which are delivered through suitable mechanism at points remote from the flowing stream.

To this end the invention consists in a toller constructed substantially as hereinafter described and claimed and as illustrated in the drawings, wherein—

Figure 2:
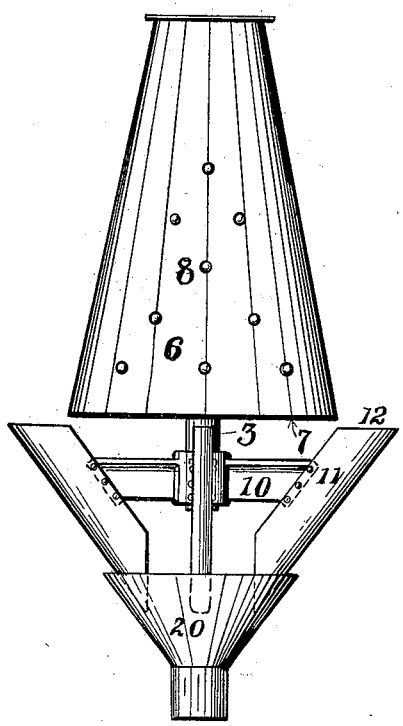
Figure 3:
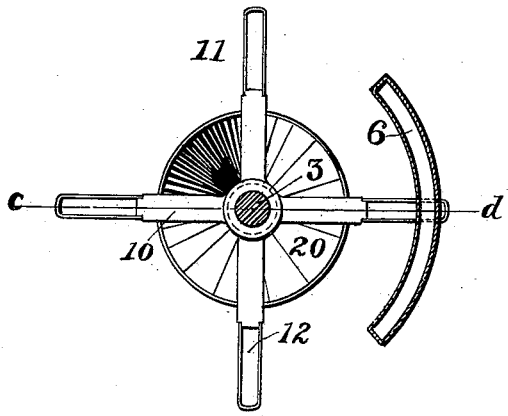

Figure 1 is a cross-section on the line $c\,d$ of Fig. 3. Fig. 2 is an outer or side elevation looking at right angles to the line of view in Fig. 1. Fig. 3 is a horizontal section on the line $a\,b$ of Fig. 1.

Referring to the said drawings, 1 is the driving-shaft, operated from any suitable source, as a pulley 2, and 3 is an upright driven shaft mounted in suitable bearings (not shown) and connected with the driving-shaft in any desired manner, as by gearing 4 5. Alongside this driven shaft stands an upright chute 6, through which passes a downwardly-flowing stream of the material to be sampled, this chute being shown in section in Figs. 1 and 3 and in elevation in Fig. 2. It is preferably of metal, with its interior tapering from the top toward the bottom on an axial line drawn through the driven shaft 3 and flaring from the top toward the bottom on a circle around this shaft, its lower end being open on a horizontal line 7. Below this lower end the material is caught in a suitable receptacle (not shown) and conveyed away to the proper point. The upright walls of this chute are connected by transverse bolts 8, preferably surrounded by tubing 9, as seen in Fig. 1, and these bolts are arranged, as indicated in Fig. 2, at various points throughout the width of the chute, their function being to disintegrate and scatter the falling material, so that it will pass out the mouth 7 in a finely-divided condition and in a steady curved stream.

On the driven shaft is supported a spider 10, preferably having four arms, and at the outer ends of these arms are carried buckets 11 of peculiar construction. Each bucket is U-shaped in cross-section and stands oblique, as indicated in Fig. 1, its upper end 12 being cut off approximately horizontal and passing just beneath the mouth 7 of the chute and its lower end 13 being cut off approximately vertical. If desired, two of these buckets opposite each other may be continued farther downward at their lower ends for a purpose described below, although this modification is not shown in the drawings.

20 is the hopper, consisting of a funnel 21, whose larger upper end or inlet 22 surrounds the lower ends of all the buckets 11 and whose body or straight lower portion 23 constitutes the delivery end thereof. If certain of the buckets are longer than the others, as described above, there can be an additional hopper within the one illustrated in Fig. 1, and this additional hopper will obviously receive the material discharged from the longer buckets only, while the outer hopper will receive the material discharged from the shorter buckets only. In that case the delivery ends of the two hoppers will diverge at some lower point, so as to pass the samples to different places for independent examination.

As seen in Fig. 3, the transverse length of the mouth 7 of the chute is approximately a quarter of a circle around the driven shaft 3, and therefore just as one bucket passes from beneath one end of this mouth the next succeeding bucket is passing under the other end thereof. Hence there is always one bucket receiving a portion of the stream of material flowing through the chute.

The relative widths of the mouth of the chute and of the buckets are proportioned as may be desired, so that the latter will receive such a part of the stream of material as is considered sufficient for proper and accurate sampling purposes.

In operation the driving-shaft rotates the driven shaft and its buckets at a predetermined speed, and the material is also fed through the chute in a steady stream and disintegrated and scattered by the bolts 8, as above described. The upper end of each bucket as it enters at a point below one side of the mouth 7 and passes from beneath it at a point below its other side cuts through the falling stream of material and constantly takes therefrom a certain portion thereof. The latter slides down the inclined body of the bucket into the hopper and passes through the delivery end of the latter to a remote point, where it can be inspected or assayed for sampling purposes. Obviously if two of the buckets deliver into the hopper shown in Fig. 1 and the other two into an inner hopper the delivery ends of the two hoppers can lead to different points, so that two operators can constantly investigate the samples, which latter will always be in the same proportion to the stream of material flowing through the chute on account of the equal size of the cutting edges or inlet ends 12 of all the buckets. Such independent sampling will give results which can be compared, so that the action and report of each operator forms a check on that of the other.

All parts of the machine are of the desired sizes, shapes, proportions, and materials, and considerable change in the details may be made without departing from the spirit of our invention. For instance, it is not necessary that the shaft 3 be driven by the specific mechanism shown and described, that there be four buckets precisely, that the sides of each bucket be parallel, as shown in Fig. 3, although we so prefer them, that the bolts with or without their tubing be employed, although we consider their use advantageous, or that the inner hopper and longer buckets be used at all.

What we claim as new is—

1. In an ore-sampler, the combination with a shaft rotating on an upright axis, a series of buckets carried thereby and having open mouths at their upper ends, and a hopper into which they deliver; of a chute delivering a stream of material substantially parallel with the shaft, its delivery end standing above the path of the bucket-mouths and being curved to conform with their movement, and a series of irregularly-arranged bolts across the chute, as and for the purpose set forth.

2. In an ore-sampler, the combination with an upright chute having converging side walls, its delivery end being curved in a horizontal line; of an upright rotary shaft standing concentric with the curvature of the end of the chute, a spider on the shaft, a series of buckets carried thereby and each having a substantially U-shaped cutting edge at its upper end which latter stands below the delivery end of the chute, the length of such delivery end being such that as one bucket passes from beneath it another enters at the other side thereof, and a hopper for receiving the samples taken by the buckets, as and for the purpose set forth.

In testimony whereof we affix our signatures in presence of two witnesses.

CHARLES A. SNYDER.
DAVID J. CHEESMAN.
JOHN A. MOORE.

Witnesses as to Snyder and Cheesman:
  JAMES COWIE,
  RALPH LEECH.
Witnesses as to John A. Moore:
  M. H. LLOYD,
  G. S. STIMMER.